United States Patent [19]
Rugraff

[11] Patent Number: 5,838,084
[45] Date of Patent: Nov. 17, 1998

[54] VEHICLE TRANSMISSION SYSTEM FITTED WITH AN ELECTRICAL RETARDER

[75] Inventor: Guy Rugraff, Pantin, France

[73] Assignee: Labavia SGE, Montigny le Bretonneux, France

[21] Appl. No.: 802,336

[22] Filed: Feb. 11, 1997

[30] Foreign Application Priority Data

Feb. 12, 1996 [FR] France .................................. 96 01688

[51] Int. Cl.$^6$ .................................................. H02K 49/04
[52] U.S. Cl. ............................ 310/105; 310/93; 310/103; 188/164; 188/161
[58] Field of Search ............................. 310/93, 103, 105, 310/67 R; 188/161, 164; 192/48.2, 48.4, 48.91; 464/29; 74/606 R

[56] References Cited

U.S. PATENT DOCUMENTS 3,908,141  9/1975  Lemonnier .................................. 310/93
4,128,147  12/1978  Ruberte .................................... 188/164

FOREIGN PATENT DOCUMENTS 2 122 035  1/1984  United Kingdom ............ H02K 49/04

OTHER PUBLICATIONS

French Search Report dated 10 Oct. 1996, French Appl. No. FR 9601688.

Primary Examiner—Steven L. Stephan
Assistant Examiner—B. Mullins
Attorney, Agent, or Firm—Marshall, O'Toole, Gerstein, Murray & Borun

[57] ABSTRACT

The vehicle transmission system comprises a gear box having a case with a closure plate screwed thereto and an outlet shaft passing through the closure plate and associated with a fork of a universal joint, in association with an electrical eddy current retarder including a stationary inductor and a rotary core, which inductor is cantilevered out from the case by means of a framework. The framework is fixed to the case by screws that also serve to fix the closure plate thereto, and the rotor has a support member which is fixed to the rear face of the fork of the universal joint. The structure and the disposition of the gear box and of the fork of the universal joint are thus independent of whether or not the electrical retarder is present.

10 Claims, 4 Drawing Sheets

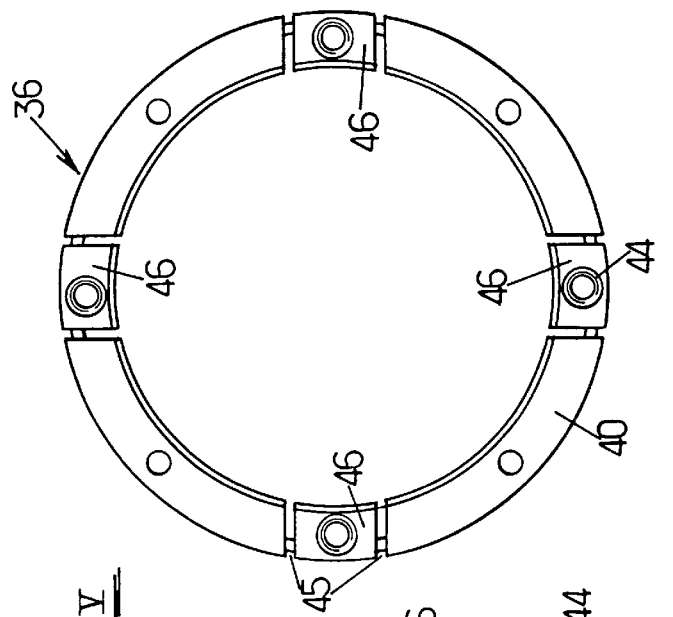
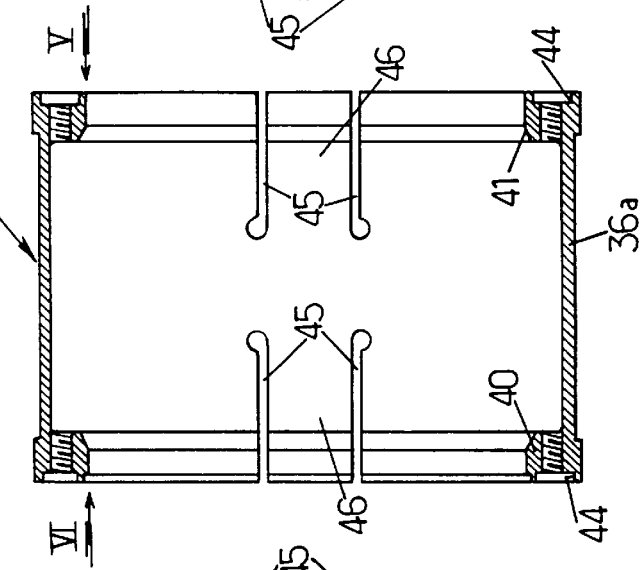
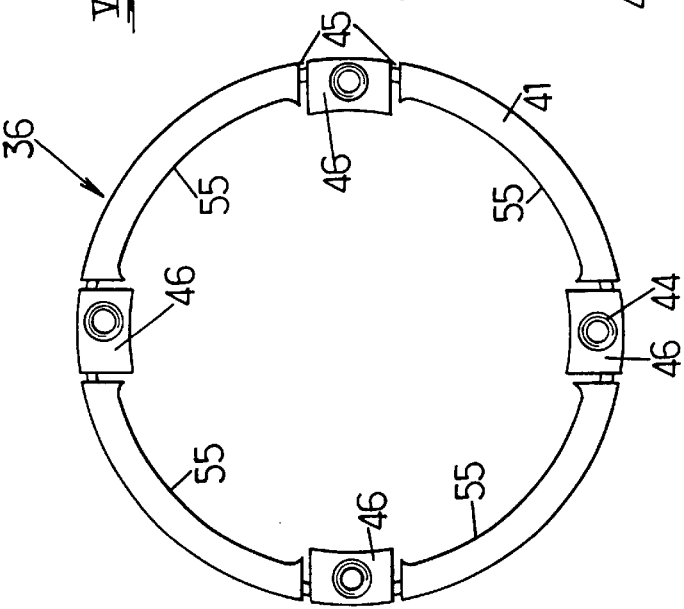

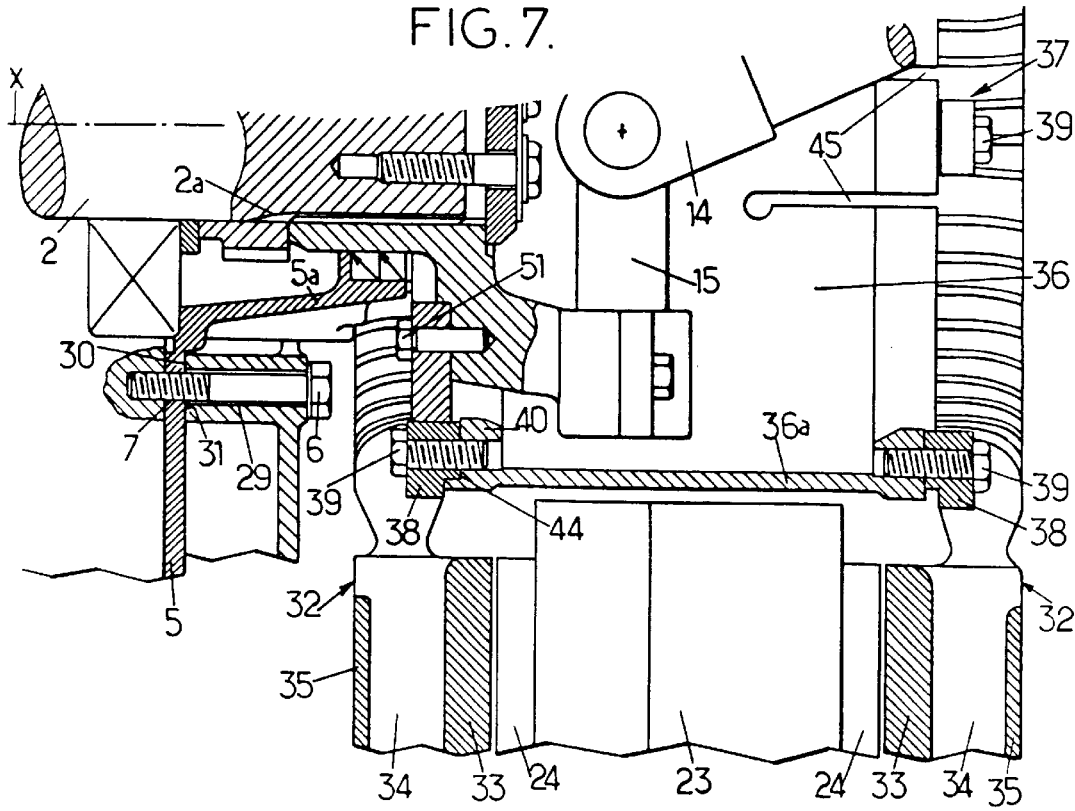
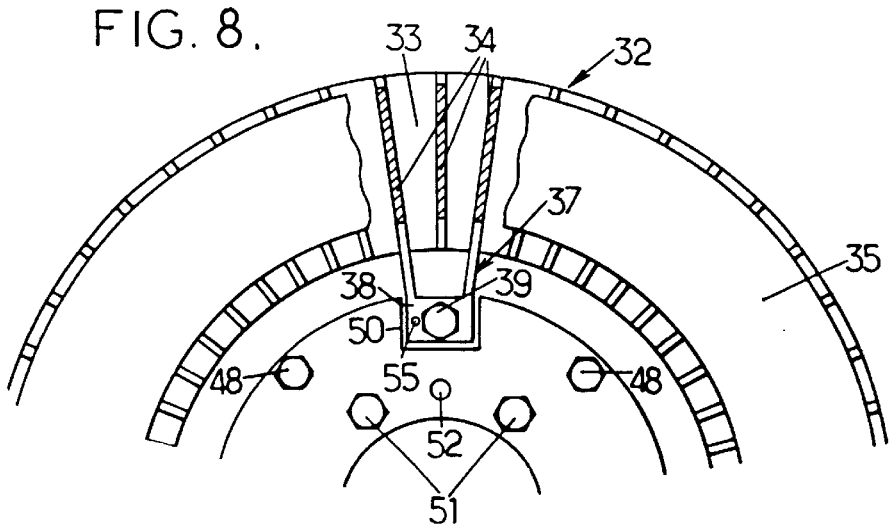

5,838,084

VEHICLE TRANSMISSION SYSTEM FITTED WITH AN ELECTRICAL RETARDER

FIELD OF THE INVENTION

The invention relates to transmission systems for self-propelled land vehicles, i.e. to systems that transmit rotary motion from the engine to the wheels of the vehicle.

In the field of such transmission systems, the invention relates more particularly to those which comprise:

- a transmission mechanism (gear box, axle assembly, etc) driven by the engine of the vehicle and having an outlet shaft rotatable about an axis, said mechanism including a case, itself comprising a main body on which a closure plate is fixed by means of screws, said closure plate extending in a mean plane perpendicular to the axis of rotation, and the outlet shaft being supported by at least one end bearing in the vicinity of the closure plate;
- a link member driven by the outlet shaft of the transmission mechanism through the closure plate and itself driving a link shaft, said link member having at least one outside shoulder which forms a rear face directed towards the closure plate, which rear face is axially offset from the closure plate leaving a certain amount of annular space free between itself and said closure plate; and
- an electrical eddy current retarder comprising both a stationary annular inductor stator cantilevered-out from the case by means of a framework, and a rotor including at least one core disk of ferromagnetic material disposed facing the inductor stator and secured to the outlet shaft of the transmission mechanism by means of a support member.

BACKGROUND OF THE INVENTION

Document FR-A-2 648 638 describes a vehicle transmission system similar to known vehicle transmission systems of the above-mentioned type, except that said document does not specify whether the case of the transmission mechanism, in particular a gear box, specifically prevents a screwed-on closure plate.

Vehicle transmission systems of the above-explained type are relatively expensive, due in particular to the following drawbacks:

- the closure plate of the case includes support portions which are specially designed for mounting the framework that supports the stator of the electrical retarder: the special closure plate is produced in relatively small quantities, so it is expensive; and
- in all known circumstances, the position of the link member is axially offset away from the case relative to the position that said link member normally occupies in the absence of an electrical retarder: this axial offset means firstly that the link shaft driven by the link member is shorter than normal, and therefore expensive since it is produced in small quantities, and secondly that the link member is cantilevered out further from the end bearing supporting the outlet shaft of the transmission mechanism, such that said end bearing needs to be reinforced, e.g. by adding an additional ball bearing, thereby making said bearing complex and expensive.

These drawbacks are troublesome under all circumstances, regardless of whether the transmission system is fitted with the electrical retarder in the factory or whether the retarder is retrofitted to a transmission system that has already been mounted in a vehicle, but without a retarder.

Nevertheless, when an electrical retarder is retrofitted on a transmission system that has already been fully installed in a vehicle and that was not originally provided with such a retarder, the above-mentioned drawbacks become even greater insofar as such retrofitting requires the closure plate of the transmission mechanism to be replaced, the end bearing that supports the outlet shaft from said mechanism to be modified, and the link shaft driven by the link member to be replaced: these various operations require expensive parts to be purchased and they are also expensive in labor, with such expenses greatly increasing the cost of retrofitting an electrical retarder on an existing transmission system.

OBJECTS AND SUMMARY OF THE INVENTION

A particular object of the present invention is to mitigate those various drawbacks.

To this end, according to the invention, in a transmission system of the kind in question, the framework is fixed to the case by at least some of the above-mentioned screws which also serve to fix the closure plate to the case, said screws passing through the closure plate, thereby clamping it between the framework and the main body of the case, and the closure plate including no support member specially designed for mounting the stator of the electrical retarder, the support member of the rotor is fixed to the rear face of the link member in the annular space between the closure plate and the rear face of the link member, the axial position of said link member being independent of the presence of the electrical retarder, and the end bearing for the outlet shaft is of a structure that is independent of the presence of the electrical retarder.

Because installing the retarder does not increase the extent to which the link member is cantilevered out from the end bearing, such installation does not significantly increase the loading on the end bearing, so it is possible to use a standard end bearing.

The only extra loading put on the end bearing by installing the retarder are the static and dynamic loads due to the rotor, however these additional loads are negligible compared to the dynamic loads that the end bearing must accommodate normally because of the normal operation of the vehicle (by way of example, these dynamic loads can be as much as 9 tons for a heavy truck).

Because of these dispositions, it is possible to use a standard vehicle transmission system and to associate an electrical retarder thereto, and this applies regardless of whether the retarder is included in the transmission system on initial assembly of the transmission system in the factory, or whether the retarder is retrofitted to an existing transmission system already mounted in a vehicle, but not having an electrical retarder.

Consequently, the cost of installing an electrical retarder is much less than it is with prior art devices, and installation itself is much simpler.

In preferred embodiments of the transmission system of the invention, use is also made of one or more of the following dispositions:

- the support member is screwed to the rear face of the link member;
- the link member includes at least one blind bore opening out into its rear face, the support member having a through bore in exact correspondence with the bore of the link member, and a metal peg being engaged as a force-fit in said two bores to ensure that the support member and the link member are completely constrained to rotate together;

the support member is a substantially annular slab extending radially outwards from the link member;

the slab is secured to a tube surrounding the link member and on which the core disk of the rotor is mounted;

the transmission mechanism is a gear box; and the link member is a fork belonging to a universal joint.

The invention also provides a method of fitting an electrical eddy current retarder to the transmission system of a self-propelled land vehicle, said transmission system comprising:

a transmission mechanism driven by the engine of the vehicle and having an outlet shaft rotatable about an axis, said mechanism including a case itself comprising a main body on which a closure plate is fixed by means of screws, said closure plate extending in a mean plane that is perpendicular to the axis of rotation and said closure plate including no support member specially designed for mounting the electrical retarder, the outlet shaft being supported by at least one end bearing in the vicinity of said closure plate, which end bearing is of a structure that is independent of the presence of the electrical retarder; and a link member driven by the outlet shaft of the transmission mechanism through the closure plate and itself driving a link shaft, said link member having at least one outside shoulder which forms a rear face directed towards the closure plate, which rear face is axially offset from the closure plate, leaving a certain amount of annular space free between itself and said closure plate, and the axial position of the link member being independent of the presence of the electrical retarder, the electrical eddy current retarder including both an annular inductor stator designed to be cantilevered out from the case by means of a framework, and a rotor including at least one core disk of ferromagnetic material disposed facing the stator and secured to be secured to the link member by means of a support member, said method including the following steps:

a) fixing the framework to the case by means of at least some of the screws of the closure plate, thereby simultaneously fixing said closure plate, said screws then passing through the closure plate which is thus clamped between the framework and the main body of the case; and b) fixing the support member of the rotor on the rear face of the link member in the annular space between the closure plate and the rear face of the link member.

In preferred implementations of the method of the invention, use is made of one or more of the following dispositions:

the method further includes a preliminary step during which:

accurately plane bearing surfaces that are accurately perpendicular to the axis of rotation are machined on the outside face of the closure plate around the fixing holes of said closure plate that receive the fixing screws of said plate, the framework including complementary bearing surfaces that face said bearing surfaces of the closure plate; and the rear face of the link member is machined so that it is accurately plane and perpendicular to the axis of rotation;

step b) is followed by a step consisting in:

piercing at least one bore both in the fixing member and in the link member such that the bore passes through the support member and penetrates into the link member; and engaging a metal peg as a force-fit in said bore, said peg penetrating both into the support member and into the link member; and the electrical retarder is fitted to a transmission system that is already fully assembled, and in which:

during step a), at least some of the fixing screws of the closure plate are removed and replaced by longer fixing screws serving also to fix the framework to the case by means of said screws; and during step b) the link member is disassembled in order to fix the support member of the rotor on its rear face, said link member then being reassembled in exactly the same axial position as it occupied initially relative to the closure plate.

BRIEF DESCRIPTION OF THE DRAWINGS

Other characteristics and advantages of the invention appear from the following detailed description of embodiments thereof given as non-limiting examples, with reference to the accompanying drawings.

In the drawings:

FIG. 4 is a view in axial section showing a detail of an intermediate tube belonging to the rotor of the electrical retarder in the transmission system shown in FIG. 1;

FIGS. 5 and 6 are end views of the FIG. 4 tube, as seen respectively in directions V and VI of FIG. 4; and FIGS. 7 and 8 are fragmentary views similar respectively to FIGS. 1 and 3 showing a variant of the system shown in FIGS. 1 to 6.

MORE DETAILED DESCRIPTION

In the various figures, the same references are used to designate elements that are identical or similar.

Figure 1:
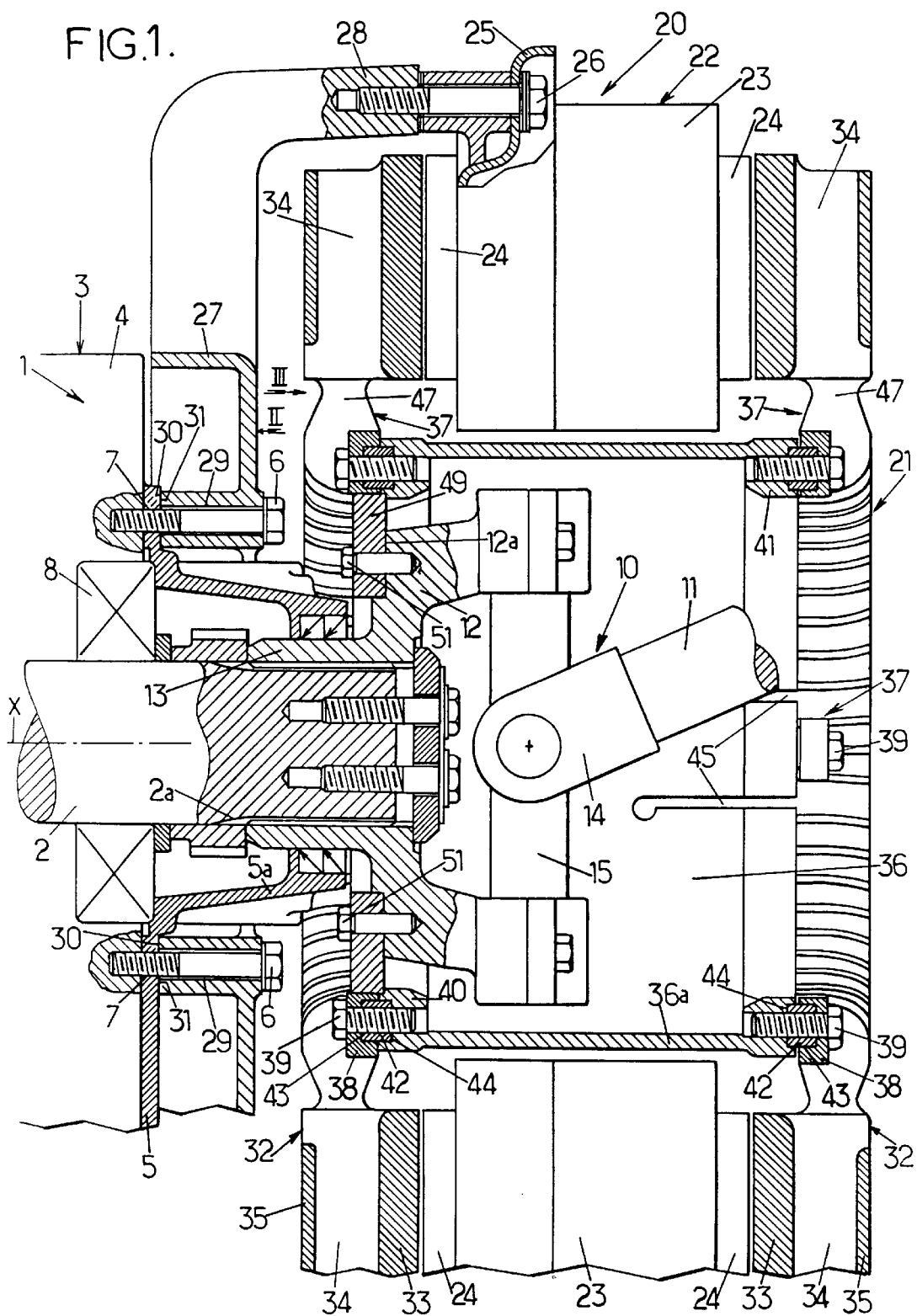
FIG. 1 is a fragmentary diagrammatic vertical section view of a vehicle transmission system constituting an embodiment of the invention, the section plane being locally offset in the vicinity of two fixing screws for the transmission mechanism closure plate and in the vicinity of a fixing screw for the stator of the electrical retarder.

FIG. 1 shows a portion of a motor vehicle transmission system, in particular for a truck or a bus.

This transmission comprises:

a gear box 1 driven by the vehicle engine (not shown) and having an outlet shaft 2 that rotates about a substantially horizontal axis X;

a universal joint 10 in a standard axial position, and independent of the presence or otherwise of an electrical retarder, said universal joint being driven by the outlet shaft 2 and itself driving a link shaft 11 which extends generally towards a second universal joint (not shown) connected to a back axle (not shown), one of the forks of the universal joint 10 (the fork 12) being provided with a sleeve 13 having internal fluting and engaged on the end of the outlet shaft 2, which end is provided with external fluting 2a corresponding with the internal fluting of the sleeve 13; and an electrical eddy-current retarder 20 mounted in a cantilevered-out position on the gear box 1, with this type of retarder being known under the registered trademark "FOCAL".

The various elements above are described in detail below.

With reference initially to the gear box 1, it is defined externally by a case 3 comprising both a main body 4 and a front closure plate 5.

The closure plate 5 does not have the support portion specially designed for mounting the electrical retarder, and more generally, it is designed independently of the presence or otherwise of an electrical retarder.

The closure plate 5 is fixed in sealed manner on the main body 4 of the case by means of screws 6 passing through holes 7 in said closure plate and screwed into the main body 4.

The closure plate 5 lies in a general plane that is perpendicular to the axis X and it has an annular central projection 5a projecting outwards. The central projection 5a is pierced by the outlet shaft 2, and it also receives the sleeve 13 of the fork 12.

Also, in the vicinity of said central projection 5a, the outlet shaft 2 is supported by an end bearing constituted by a ball bearing 8 which is standard and which is dimensioned independently of the presence or otherwise of the electrical retarder 20.

In conventional manner, the electrical retarder 20 comprises a core 21 that rotates with the shaft 2 and an inductor 22 that is stationary and includes electromagnetic coils 23 which, when carrying an electrical current, generate eddy currents in the rotor 21, thereby causing said rotor to exert braking torque on the shaft 2.

There is an even number of stator coils 23, with each coil having its own respective ferromagnetic core (not shown) extending longitudinally parallel to the axis X between two poles 24. The set of poles 24 forms two rings centered on the axis X, the poles 24 in each of the ring being alternately north and south.

The coils 23 and their respective cores are carried by a rigid end plate 25 of non-magnetic material that is substantially annular in shape and that is itself fixed by screws 26 to four arms 28 of a framework 27.

Figure 2:
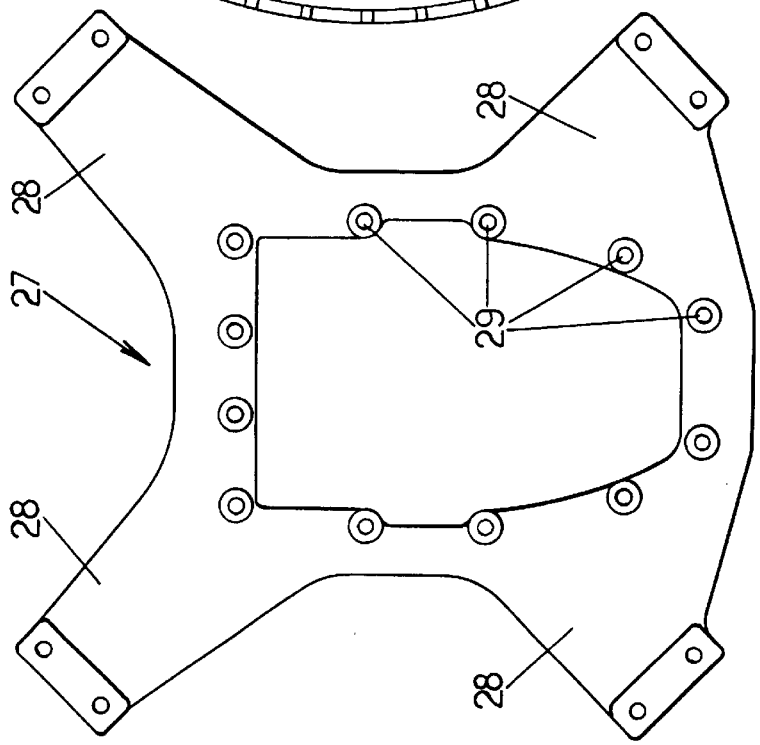
FIG. 2 is a diagrammatic view seen along direction II of FIG. 1, showing the framework which supports the stator of the electrical retarder.

The framework 27 which is clearly visible in FIGS. 1 and 2 is constituted by a rigid part that can be made, for example, as a GS type casting, and that has holes 29 in register with the holes 7 of the closure plate.

The above-mentioned screws 6 pass through these holes 29, with the heads of the screws pressing against the outside face of the framework 27, thereby simultaneously securing said framework and the closure plate 5 to the main body 4 of the case, such that the closure plate 5 is clamped between the framework 27 and the main body 4.

In order to enable such clamping to be performed under good conditions, it may possibly be necessary to interpose pieces of shim between the fixing plate 5 and the framework 27 in the vicinity of the screws 6.

However, it is preferable to machine the annular bearing surfaces 30 so that they are accurately plane and accurately perpendicular to the axis X on the outside face of the closure plate 5 around each of the holes 7, and for the framework 27 similarly to include machined bearing surfaces 31 that are accurately plane and accurately perpendicular to the axis X. The bearing surfaces 30 and 31 are disposed in register and they are in mutual contact, thereby enabling the framework 27 to bear properly against the closure plate 5.

Figure 3:
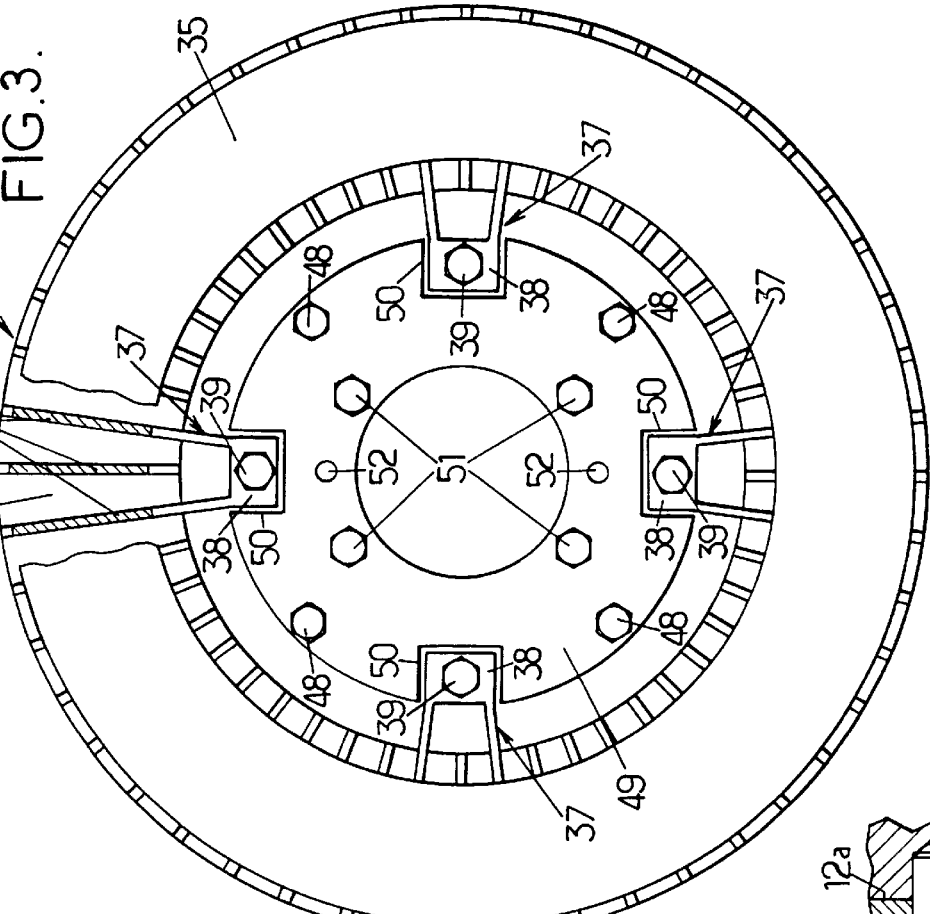
FIG. 3 is a view seen along direction III of FIG. 1, showing the rotor of the electrical retarder.

The rotor 21, which is clearly visible in FIGS. 1 and 3, also includes two wheels 32 each of which lies in a radial plane, and both of which are made of ferromagnetic material, generally of steel.

Each of the wheels 32 comprises a relatively thick annular disk 33 disposed facing one of the rings of poles 24 of the stator, with a narrow gap (e.g. 1 mm to 3 mm) being left between said disk 33 and the corresponding poles 24.

Each disk 33 is secured to a ring of blades 34 forming cooling fins and all extending in the radial plane of the corresponding wheel 32.

In addition, in the example shown in the drawings, each set of blades extends in a radial direction, but optionally each of them could extend in a direction that is inclined relative to the radial direction, while still remaining in the radial plane of the corresponding wheel 32.

On the face of each wheel 32 that is further from the stator, the sets of blades 34 are also spaced apart by a relatively thin angular disk 35.

This disk 35 thus co-operates with the thick disk 33 to define an annular space in which the blades 34 are disposed and in which cooling air for the wheels 32 is channeled.

Also, each wheel 32 of the rotor is mounted at one of the axial ends of an intermediate tube 36 of steel that is generally in the form of a circular cylinder about the axis X.

In order to make this assembly, each wheel 32 of the rotor includes four fixing arms 37 disposed at 90° to one another and each constituted by two blades 34 extended inwardly to a fixing plate 38, itself fixed to the intermediate tube 36 by a screw 39 parallel to the axis X.

In the example shown in FIG. 3, the two blades 34 together forming each fixing arm 37 are themselves separated by an intervening blade 34 that is not extended radially inwards, but this particular disposition is not limiting.

The fixing arms 37 extend in the radial plane of the corresponding wheel 32 without extending diagonally axially towards the midplane of the retarder, as used to be the case in prior art electrical retarders: this makes the wheels 32 easier to make, particularly when the wheels are made by molding.

Also, the intermediate tube 36 which is shown in detail in FIGS. 4 to 6 has first and second substantially annular flanges 40 and 41 at its respective ends, with the screws 39 for securing the wheels 32 being screwed thereto.

In order to minimize angular clearance for mounting the wheels 32 on the flanges, the screws 39 pass through steel rings 42 each of which is a force-fit both in a bore 43 belonging to the corresponding plate 38, and in a bore 44 belonging to the corresponding flange 40, 41.

In addition, the intermediate tube 36 preferably includes slots 45 extending axially towards the inside of the tube from one or the other of the two ends of the tube, with each slot 45 extending over less than half the axial length of the tube, e.g. over about ⅓ the length of the tube.

The slots 45 are disposed in pairs on either side of each screw 39, thereby defining axial tongues 46 at both ends of the tube 36 with the arms 37 of the wheels 32 being fixed to the ends of said blades.

These metal tongues 46 are strong enough to avoid being significantly deformed under the effect of the external constraints to which the wheels 32 are subjected, and in particular:

the weights of the wheels 32 (e.g. about 30 kg per wheel);

the vertical dynamic constraints due to the running of the vehicle, which can give rise for example to accelerations of as much as 2 g to 3 g, depending on the circumstances of use;

the braking torque obtained in operation of the electrical retarder, said torque possibly taking a value of about 2,000 Nm to 2,500 Nm, for example; and the magnetic attraction force to which the wheels 32 are subjected towards the poles 24, said force possibly exceeding one (metric) ton, for example, depending on the size of the air gap.

In contrast, the metal tongues 46 are dimensioned so as to be capable of deforming elastically radially towards the outside when the wheels 32 of the rotor are subjected to thermal expansion due to the high temperatures to which they can be raised in operation of the retarder, thereby compensating for lack of radial deformability in the fixing arms 37.

Where appropriate, the fixing arms 37 may also be designed to be capable of radial deformation. Such deformability may be obtained, for example, by giving sufficient curvature to the extensions of the blades 34 constituting the fixing arms 37, which fixing arms preferably remain situated in the same radial plane as the corresponding wheels 32.

In addition, each of the blades 34 which extend radially inwards to form a fixing arm 37 preferably presents a narrowing 47 in the X direction between the disk 33 and the corresponding plate 38.

This narrowing 47 serves to reduce the stiffness of the arms 37 in bending, thereby limiting the stresses due to thermal deformation of the parts.

Finally, the first flange 40 of the intermediate tube 36 is fixed to a steel slab 49 by means of four screws 48 that are angularly offset by 45° relative to the screws 39.

The slab 49 is situated substantially in the same radial plane as the plates 38 for fixing the wheels 32, and it has external notches 50 through which said plates 38 pass.

The slab 49 is fixed by means of screws 51 to the rear face 12a of the fork 12 of the universal joint, in an annular space left free between the fork 12 and the closure plate 5.

The rear face 12a is formed by an outer shoulder presented by the fork 12, and said rear face is preferably machined so as to be accurately plane and perpendicular to the axis X.

Figure 3A:
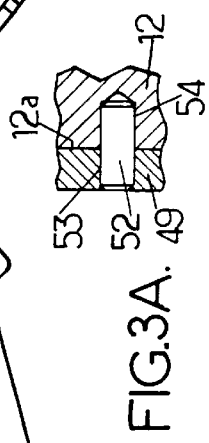
FIG. 3A is a view showing a detail of FIG. 3 in section.

In order to guarantee assembly without angular clearance of the slab 49 relative to the fork 12, the screws 51 are advantageously associated with metal pegs 52 constituting force-fits both in respective bores 53 passing axially through the slab 49 and in respective blind bores 54 penetrating into the fork 12 from its rear face 12a (see FIG. 3A).

It will be observed that the above-described intermediate tube 36 is effective in limiting the diametrical extent of the electromagnetic retarder.

The central portion 36a of the intermediate tube, lying axially between the two flanges 40 and 41 can be situated radially very close to the coils 23 since the fixing arms 37 of the two wheels 32 are not united in the center of the rings of coils 23, unlike prior art devices.

Also, because the central portion 36a of the intermediate tube needs to support only one wheel 32 and not two wheels, this central portion can be relatively thin and, for example, its thickness may be about 6 mm.

Also, the flanges 40 and 41 of the intermediate tube 36 extend radially inwards relative to the central portion 36a of the tube, such that the intermediate tube has substantially no portions projecting radially outwards, thus making it possible both to insert the intermediate tube 36 easily into the ring of coils 23 in spite of the small amount of radial clearance that exists between the set of coils and the ring, and also to limit the radial extent of the intermediate tube.

The fact that the flanges 40 and 41 are disposed on the inside of the intermediate tube does not hinder in any way the operation of the universal joint 10 insofar as the flange 40 is secured to the fork 12 of said joint while the flange 41 is situated axially beyond the other fork 13 going away from the gear box, i.e. in register with the shaft 11, taking up much less space than the universal joint 10.

Finally, to further restrict the radial clearance required between the universal joint 10 and the central portion 36a of the intermediate tube, the second flange 41 of said intermediate tube has scalloping 55 on the inside in its portions extending between the deformable tongues 46.

A large universal joint can thus be mounted inside the intermediate tube 36 by passing the branches of the cross-member 15 of the universal joint and the two forks 12 and 14 thereof via the scalloping 55.

The above-described device can be made completely in the factory on initial assembly of the transmission system, however it can also be made by retrofitting the electrical retarder to a transmission system that is already mounted on a vehicle.

Under such circumstances, it is preferable to proceed as follows:

after disassembling the universal joint 10, at least some of the fixing screws 6 for the closure plate 5 are removed;

the bearing surfaces 30 are machined on the outside face of the closure plate 5;

the initial screws 6 are replaced by longer fixing screws 6, and the framework 27 is fixed to the case by means of these new screws, while simultaneously clamping the closure plate 5 between the framework 27 and the main body 4 of the case;

the rear face 12a of the fork 12 is machined so as to give it a surface that is accurately plane and perpendicular to the axis X;

three tapped holes are formed in the fork 12, starting from its rear face;

the fork 12 is engaged inside the intermediate tube 36 that has previously been fixed to the slab 49, and the fork 12 is fixed to the slab 49 by means of screws 51;

bores 53 and 54 are pierced simultaneously through the slab 49 and in the fork 12, after which metal pegs 52 are force-fitted in said bores, the fork 12 is reassembled onto the outlet shaft 2 from the gear box, and simultaneously the end plate 25 of the stator is fitted to the framework 27 by means of screws 26; and the universal joint 10 and the shaft 11 are fully reassembled.

It will be observed that the rings 42 used for mounting the wheels 32 can advantageously be omitted, as shown in FIGS. 7 and 8.

In this case, it is preferable to provide metal pegs 55 disposed adjacent to at least some of the screws 39 and engaged as force-fits both in the corresponding plate 38 and in the corresponding flange 40, 41.

I claim:

1. A transmission system for self-propelled land vehicles, the transmission system comprising:

a transmission mechanism driven by the engine of the vehicle and having an outlet shaft rotatable about an axis, said mechanism including a case itself comprising a main body on which a closure plate is fixed by means of screws, said closure plate extending in a mean plane perpendicular to the axis of rotation, and the outlet shaft being supported by at least one end bearing in the vicinity of the closure plate;

a universal joint fork which is directly fixed to the outlet shaft of the transmission mechanism through the closure plate and itself driving a link shaft, said universal joint fork having at least one outside shoulder which forms a rear face directed towards the closure plate, which rear face is axially offset from the closure plate leaving a certain amount of annular space free between itself and said closure plate; and an electrical eddy current retarder comprising both a stationary annular inductor stator cantilevered out from the case by means of a framework, and a rotor including at least one core disk of ferromagnetic material disposed facing the inductor stator and secured to the outlet shaft of the transmission mechanism by means of a support member, wherein the framework is fixed to the case by at least some of the above-mentioned screws which also serve to fix the closure plate to the case, said screws passing through the closure plate, thereby clamping it between the framework and the main body of the case, the support member of the rotor being fixed solely to the rear face of the universal joint fork in the annular space between the closure plate and rear face of the universal joint fork.

2. A transmission system according to claim 1, in which the support member is screwed to the rear face of the universal joint fork.

3. A transmission system according to claim 2, in which the universal joint fork includes at least one blind bore opening out into its rear face, the support member having a through bore in exact correspondence with the bore of the universal joint fork, and a metal peg being engaged as a force-fit in said two bores to ensure that the support member and the universal joint fork are completely constrained to rotate together.

4. A transmission system according to claim 1, in which the support member is a substantially annular slab extending radially outwards from the universal joint fork.

5. A transmission system according to claim 4, in which the slab is secured to a tube surrounding the universal joint fork and on which the core disk of the rotor is mounted.

6. A transmission system according to claim 1, in which the transmission mechanism is a gear box.

7. A method of fitting an electrical eddy current retarder to a transmission system for a self-propelled land vehicle, said transmission system being initially fully assembled and deprived of any eddy-current retarder, the transmission comprising:

a transmission mechanism driven by the engine of the vehicle and having an outlet shaft rotatable about an axis, said mechanism including a case itself comprising a main body on which a closure plate is fixed by means of screws, said closure plate extending in a mean plane that is perpendicular to the axis of rotation, the outlet shaft being supported by at least one end bearing in the vicinity of said closure plate, a universal joint fork driven by the outlet shaft of the transmission mechanism through the closure plate and itself driving a link shaft, said universal joint fork having at least one outside shoulder which forms a rear face directed towards the closure plate, which rear face is axially offset from the closure plate, leaving a certain amount of annular space free between itself and said closure plate, the electrical eddy current retarder including both an annular inductor stator designed to be cantilevered out from the case by means of a framework, and a rotor including at least one core disk of ferromagnetic material disposed facing the stator and designed to be secured to the universal joint fork by means of a support member, said method including the following steps:
disassembling the universal joint fork, fixing the framework to the case by means of at least some of the screws of the closure plate, thereby simultaneously fixing said closure plate, said screws then passing through the closure plate which is thus clamped between the framework and the main body of the case, fixing the support member of the rotor on the rear face of the universal joint fork, in the annular space between the closure plate and said rear face, and reassembling the universal joint fork in exactly the same axial position as it occupied initially relative to the closure plate.

8. A method according to claim 7, further including a preliminary step during which:

accurately plane bearing surfaces that are accurately perpendicular to the axis of rotation are machined on an outside face of the closure plate around the fixing holes of said closure plate that receive the fixing screws of said plate, the framework including complementary bearing surfaces that face said bearing surfaces of the closure plate; and the rear face of the universal joint fork is machined so that it is accurately plane and perpendicular to the axis of rotation.

9. A method according to claim 7, in which the step of fixing the support member of the rotor on the rear face of the universal joint fork, in the annular space between the closure plate and said rear face is followed by a step consisting in:

piercing at least one bore both in the fixing member and in the universal joint fork such that the bore passes through the support member and penetrates into the universal joint fork; and engaging a metal peg as a force-fit in said bore, said peg penetrating both into the support member and into the universal joint fork.

10. A method according to claim 7, in which at least some of the fixing screws of the closure plate are removed and replaced by longer fixing screws, said longer screws then being passed through the framework and the closure plate and being screwed to the main body of the case, thus fixing said framework and said closure plate to the main body of the case.

* * * * *